United States Patent Office 3,337,675
Patented Aug. 22, 1967

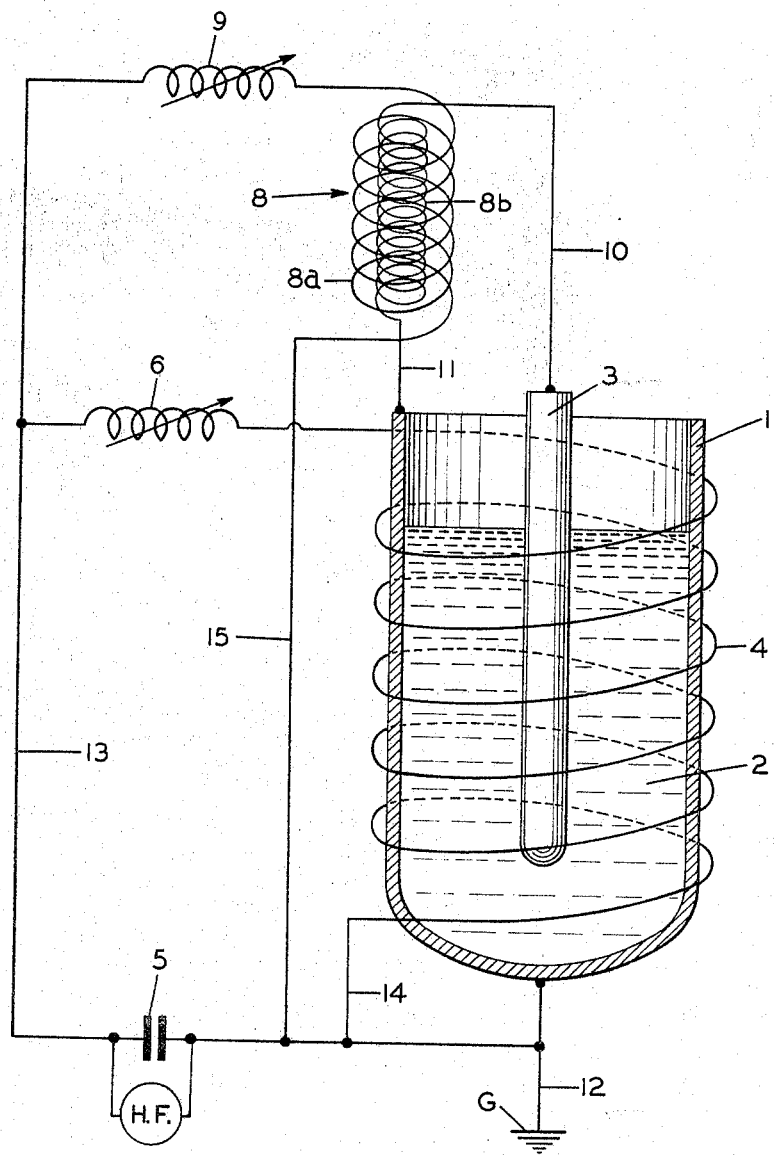

3,337,675
MANUFACTURE OF GLASS
Maurice Descarsin, Paris, France, assignor to Societe des Verreries Industrielles Reunies du Loing (S.O.V.I.R.E.L.), Paris, France
Filed Jan. 29, 1964, Ser. No. 341,007
Claims priority, application France, Feb. 2, 1963, 923,543
7 Claims. (Cl. 13—6)

This invention relates to the manufacture of glass, particularly to the making of glass of high quality free from certain imperfections characteristic of some glasses of the prior art, and to apparatus for such manufacture. The apparatus is adapted to the manufacture of glass from any batch of raw materials, for instance from any of the batches listed in Tooley's "Handbook of Glass Manufacture," and in each instance it will produce a glass superior to that which is produced by standard commercial methods, and which is superior to the glasses produced by more esoteric methods which have been designed for the production of higher quality glass.

Certain special glasses, and certain glasses hard to melt and difficult to homogenize, and glasses the use of which requires the absence of any impurity or of bubbles however fine, require special means and methods of manufacture than those used for ordinary forms of glass. This has led to the use of metal crucibles which are not oxidized in the air at fusing and fining temperatures, and which are insoluble in the fused glass. Such crucibles are usually platinum or platinum alloys.

In using such special melting apparatus special techniques have often been adopted. For instance it has been customary to introduce many more calories per unit of volume of the molten mass than in the manufacture of glass by ordinary commercial methods. Thus the quantity and concentration of power per unit of weight has been greater. Such methods have produced improved results but have had imperfections of their own:

The use of noble metal crucibles such as platinum, the softening temperature under load of which is rather close to the temperature required for the melting of such glasses imposes a limit on the temperature of the crucible and consequently on the power used to heat the crucible. Consequently, it has been suggested to apply maximum power directly to the molten mass and to avoid the standard methods of heat transfer from a source to the matter to be heated. Thus, it has been proposed to heat the glass by Joule effect, passing an electric current through the glass at the frequency of the power mains, for instance by immersing an electrode in the fusion mass and connecting the metal crucible and the electrode to the mains, usually through some apparatus for varying the power input. The crucible may also be heated by another source of heat in order to start the fusion and furnish a melt through which the current can flow between the electrode and the crucible. The raw materials fed on the surface of the melt, are melted rapidly, and increase progressively the volume of glass heated by Joule effect. Under such conditions the overheating of the crucible is avoided because it is never heated above the temperature of the bath, but the process is severely limited when applied to glass of special types and of difficult manufacture:

Such glasses require specific heats for their formation which are higher than the crucibles will stand. When such heats are applied there is a more or less marked diffusion of platinum into the glass from the crucible, an abundant formation of tiny bubbles on the surfaces of the electrodes, which are practically impossible to eliminate.

To overcome such defects it has been proposed to heat the raw materials and then the melt by dielectric hysteresis in the same apparatus, using the electrodes as the plates of a condenser to the contacts of which is applied high frequency current at chosen voltage, current of several tens of megaherz for example, and that method produces superior results by reducing or eliminating the diffusion of platinum and the appearance of bubbles in the melt. However, the melting of the mass passes through different phases, for instance melting, fining and conditioning, each of which has its own requirements, and it is difficult to apply to each phase its own specific requirements of power, especially during commercial manufacture. To approach satisfactory operation it has been necessary to use extremely high frequencies, frequencies so high as to be incompatible with the geometric dimensions of the condenser armatures (e.g. the electrode and the crucible) and with the vitreous mass constituting the resistance that is extremely high tensions which are so high that they establish perturbations in the electric circuits and even in the elements of the furnace itself. Furthermore, such conditions have required that the means of heating the crucible have an additional power supply of very high frequency, which increases the investment and costs of exploitation and introduces undesirable complications into the apparatus. But the use of such very high frequencies and voltages, among numerous electrical circuits of control and an assembly of mechanical devices to supply the furnace with raw materials, to draw off the molten glass, establishes an electromagnetic radiation so intense that it often exceeds the amount tolerable to systems of telecommunication or to the laws applicable to the protection of such systems because the usual shielding is not practically useful due to the complexity and the importance of such melting apparatus.

It is an object of the invention to improve the manufacture of special glasses, and of all glasses, to produce superior glass in any category, to reduce the complexity and cost of melting furnaces for such use, and to produce more flexible and controllable processes and apparatus for making glass. Another object is to reduce or eliminate the defects of the prior art as stated hereinabove, even while using similar apparatus.

The crucible is heated by high frequency induction and the glass by Joule effect by the direct passage of a current, said current being furnished from the secondary of a transformer of low impedance which primary is connected in derivation on the same high frequency source as the inductor.

The drawing is a diagrammatical view in section of an apparatus conforming to the principles of the invention.

The apparatus includes platinum crucible 1 containing a mass 2 of molten glass in the midst of which is a platinum electrode 3. The electrode and the crucible are connected by leads 10, 11 to the ends of the secondary low impedance coil $8b$ of transformer 8. The ground wire 12 connects the crucible to ground G and to the power line 13, in which is condenser 5. Two circuits in parallel are supplied by line 13, a circuit 14 which includes the induction coil 4, which encloses the crucible, and the variable inductance 6, and the circuit 15 which includes the primary coil $8a$ of transformer 8 and variable inductance 9.

The source of power is a high frequency generator connected to the condenser 5. The transformer is of step-down type. The variable inductance 6 serves to control the heating of the crucible and the variable inductance 9 serves to control the heating of the melt by Joule effect of the current flowing from electrode 3 to the crucible wall.

The crucible, in the practice of the invention, is heated by high frequency induction, the technique of which is well known, and the glass is internally heated by Joule effect, these heatings being simultaneous but separately regulated so as to combine their effects to best advantage, producing a high concentration of power in the bath but without the need to heat the crucible to a temperature at which the crucible is made weak and invites contamination of the glass.

According to the invention the source of internal heating of the melt is derived from the alternating current of the high frequency generator, the voltage applied to the electrode and crucible being reduced to a value consistent with the output of a step-down transformer of low impedance.

The construction of the apparatus allows the regulation of the two types of heating each to its own optimum value although both are derived from the same source. Each is continuously variable and each bears to the other a relationship established by the transformer and modified by the variable inductances.

In order to achieve the best results the power supply, as connected to the armatures of the condenser, is subject to regulation and control by any of the means currently used for the continuous regulation of high frequency current supplied by the generator. Variable inductances are shown but other apparatus can be used, for instance, variometers, iron-core reactor, or by displacement of a traveler on air inductance coil. Each of these means may be operated manually or by temperature responsive apparatus associated with the bath on one hand and the crucible on the other.

EXAMPLE

As example, the melting of a batch composed of:

|   | Kg. |
|---|---|
| Sand | 47.520 |
| Boric acid | 49.600 |
| Carbonate of baryta | 103.200 |
| Alumina | 5.920 |
| Total | 206.204 | has given 160 kg. of raw optical glass having the following characteristics:

| | |
|---|---|
| Refracting index | 1.620 |
| Dispersion factor | 60 |

The power applied to the high frequency generator (180,000 Hertz) for the induction heating of the crucible was about 40 kw. during 10 hours and the power for the heating of the glass bath by Joule effect was about 12 kw. during 4 hours.

The high frequency currents were for the induction heating about 800 A. and for the heating of the glass by Joule effect variable from 200 to 400 A. according to the modification of the mass of the glass bath.

The grounding of the crucible and of the inductor is realized by means of low impedance connections (large surface and short length) the connection to the bottom of the crucible being constituted by a platinum band of 25 cm. length and 4 cm. width sealed on one part to the crucible and connected on the other part to a copper band connected to the ground.

The earth connection is constituted by a sheet of copper about 6 square meters which end is driven down 2 meters in the earth.

The advantages of the invention are the making of better glass by better control of all operating conditions, the control being regulable at will for each stage of the process; the power of each of the heating means being balanced against and a function one of the other; the simplification of apparatus; the prolongation of life of the crucible and electrode, the elimination of bubble formation on the electrodes and from the glass, and the production of superior types of glass from refractory and difficult formulations. Other advantages will be apparent to the skilled.

As many apparently widely different embodiments of the present invention may be made without departing from the spirit and scope thereof, it is to be understood that the invention is not limited to the specific embodiments.

I claim:
1. Glass melting apparatus consisting in its essential elements of an electrically conductive, refractory crucible, a ground therefor, an electrically conductive electrode therewithin in position to contact the contents of the crucible, transformer coil means connecting the electrode and the crucible for the passage of current through the contents thereof, induction coil means about the crucible including a circuit having a variable inductance and a condenser connected to a high frequency power source, other circuit means connected to the condenser and high frequency power source including other transformer coil means electrically associated with the first transformer coil means, and a variable inductance connected to the condenser and the other transformer coil means.

2. Glass melting apparatus comprising a crucible of refractory metal containing a Joule effect electrode spaced from the wall thereof, and means to heat the crucible and its contents including a source of high frequency current, an induction coil operatively associated with the crucible and its contents which is connected to said source by a circuit containing a variable inductance, a step-down transformer primary connected to said source by a circuit which includes a variable inductance, and a low impedance circuit including the secondary of the transformer to which the crucible is connected on one side and the electrode is connected thereto on the other side, and ground means connected to the crucible, the said primary circuit, and the induction coil circuit.

3. Glass melting apparatus comprising an oscillatory circuit of a high frequency generator, an electrically conductive crucible associated in a Joule effect heating circuit comprising the crucible and an electrode, and having high frequency inductive heating means comprising a coil adjacent the crucible, a high frequency power supply means, a low impedance transformer circuit having its primary winding connected across said oscillatory circuit of the high frequency generator and its secondary winding connected to the Joule effect heating circuit, the primary winding of the transformer and the high frequency inductive heating means being connected in parallel to said high frequency power supply, and means to vary the current in said Joule effect heating circuit and said transformer circuit independently.

4. The apparatus of claim 2 in which the primary of the transformer of low impedance and the induction heating means are connected in parallel to the power supply means, and in which each said connection contains power varying means.

5. The apparatus of claim 3 which further comprises a single condenser means connected between the high frequency source and said transformer and Joule effect heating circuits.

6. A method of melting glass in an electrically conductive crucible which comprises simultaneously heating the same portion of the body of the glass by passing alternating current therethrough and by applying high frequency induction to the crucible, providing a single source of alternating current for the current passing through the glass and the current applying the high frequency induction to the crucible, and varying both currents independently.

7. Glass melting apparatus comprising transformer means having primary and low impedance secondary circuits, a crucible and an electrode constituting a part of the low impedance circuits adapted to heating the contents of the crucible by Joule effect, an induction coil operatively associated with the crucible, a source of high frequency current connected to the primary circuit of the transformer and to the induction coil of the crucible, variable inductance means associated with the induction coil, variable inductance means connected with the primary of the transformer, and a ground connected to the induction and transformer circuits.

References Cited

UNITED STATES PATENTS

| | | |
|---|---|---|
| 1,572,873 | 2/1926 | Allcutt. |
| 2,186,718 | 1/1940 | Ferguson. |
| 2,385,567 | 9/1945 | Descarsin _____ 219—10.53 X |
| 2,643,434 | 6/1953 | Scharf _____ 219—10.41 X |
| 3,205,292 | 9/1965 | Descarsin _____ 13—6 |

FOREIGN PATENTS

| | | |
|---|---|---|
| 1,237,883 | 6/1960 | France. |

JOSEPH V. TRUHE, *Primary Examiner.*